Figure 1:
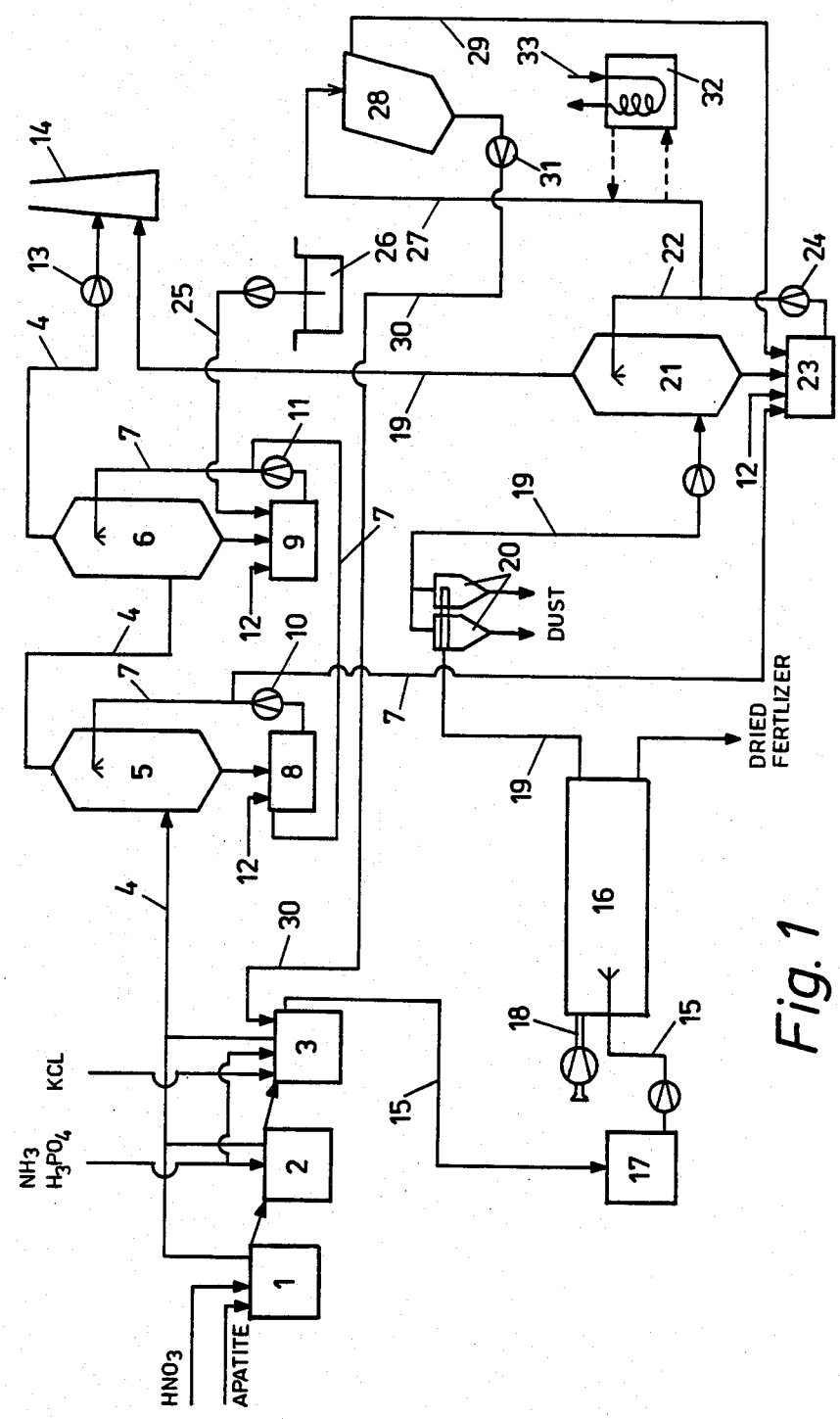

ant Examiner—Anthony McFarlane

United States Patent [19]

Lammi

[11] Patent Number: 4,662,929
[45] Date of Patent: May 5, 1987

[54] METHOD FOR RECOVERING NUTRIENTS FROM THE FLUE GASES OF A FERTILIZER PLANT

[75] Inventor: Pekka T. Lammi, Espoo, Finland

[73] Assignee: Kemira Oy, Helsinki, Finland

[21] Appl. No.: 744,138

[22] Filed: Jun. 12, 1985

[30] Foreign Application Priority Data

Jun. 20, 1984 [FI] Finland ................................ 842508

[51] Int. Cl.⁴ .............................................. C05B 7/00
[52] U.S. Cl. ........................................ 71/35; 71/36;
71/59; 71/64.08; 55/68; 55/70; 55/72; 423/238;
423/240; 423/215.5; 423/309; 423/310;
423/313
[58] Field of Search ............... 423/310, 309, 307, 305,
423/392, 238, 237, 313; 55/70, 68, 72; 71/64.08,
57–60, 35, 36, 59

[56] References Cited

U.S. PATENT DOCUMENTS

| 3,798,021 | 3/1974 | Bress et al. ............................ 71/59 |
| 3,985,523 | 10/1976 | Kaudas et al. ........................... 71/59 |
| 3,985,538 | 10/1976 | Hicks et al. .......................... 423/310 |
| 4,117,089 | 9/1978 | Fujita et al. ........................... 423/310 |
| 4,174,379 | 11/1979 | Froehlich et al. ....................... 71/59 |
| 4,226,833 | 10/1980 | Mainardi ............................. 423/310 |
| 4,271,134 | 6/1981 | Teller ................................. 423/238 |
| 4,308,049 | 12/1981 | Mini .................................. 423/310 |
| 4,329,326 | 5/1982 | Asagao et al. ....................... 423/310 |
| 4,493,820 | 1/1985 | Clausen ............................... 423/310 |
| 4,505,733 | 3/1985 | Lykov et al. ......................... 423/310 |
| 4,536,378 | 8/1985 | White ................................. 423/310 |
| 4,604,126 | 8/1986 | Moraillon ........................... 71/64.05 |

Primary Examiner—Andrew H. Metz
Assistant Examiner—Anthony McFarlane
Attorney, Agent, or Firm—Wood, Dalton, Phillips, Mason & Rowe

[57] ABSTRACT

The invention relates to a method of recovering nutrients from the flue gases of a fertilizer plant by exposing hot, almost water-saturated reaction gases (4) obtained from the fertilizer production process to a countercurrent scrubbing (5, 6) and by scrubbing the hot gases (19) obtained from the drying (16) of the fertilizer, in order to recover the gaseous impurities present in the gases. According to the invention, the hot gases (19) obtained from the drying of the fertilizer are scrubbed (21) with the scrubbing solution (7) coming from the countercurrent scrubbing (5, 6) of the hot, almost water-saturated reaction gases (4), in order to concentrate this scrubbing solution (7) before it is returned to the fertilizer production process (1–3).

9 Claims, 3 Drawing Figures

METHOD FOR RECOVERING NUTRIENTS FROM THE FLUE GASES OF A FERTILIZER PLANT

The present invention relates to a method for recovering nutrients from the flue gases of a fertilizer plant by exposing the hot, almost water-saturated reaction gases obtained from the fertilizer production process to a countercurrent scrubbing and by scrubbing the hot gases obtained from the drying of the fertilizer, in order to recover the gaseous and solid impurities present in the gases.

The invention especially relates to a process for recovering nutrients from the flue gases of a fertilizer plant which utilizes starting materials containing phosphorus, nitrogen and/or potassium, said fertilizer plant being preferably a mixed NPK-fertilizer plant.

As all prices have increased, more and more attention has been paid to the drying costs of fertilizer. In order to reduce the costs, endeavours are made to have as low a water content as possible in the fertilizer slurry to be dried. This economy requirement has led to a situation in which nutrient-bearing process effluents, such as scrubbing waters from gas scrubbers, can be returned to the process only to a limited extent.

The flue gases of a fertilizer plant also contain various valuable gaseous impurities, such as ammonia, fluorides, and oxides of nitrogen, as well as solid fertilizer particles and aerosols. Increasing attention is therefore being paid to effective purification of the flue gases. However, in fertilizer plants the gases have to be purified in such a way as not to produce nutrientbearing effluents which would pollute watercourses.

The object of the present invention is therefore to provide a method of recovering nutrients from the flue gases of a fertilizer plant, preferably a NP- or NPK-fertilizer, without subtantially increasing the water content of the fertilizer slurry obtained from the fertilizer production process or the consumption of oil in the drying of this fertilizer slurry. It is a further object of the invention to provide a method for a more complete recovery than previously of nutrients from the flue gases of a fertilizer plant by scrubbing these flue gases with water, without thereby substantially increasing the consumption of oil in the drying of the fertilizer slurry. By means of the invention it is possible to achieve a completely closed solution cycle.

From U.S. Pat. No. 4,271,134 there is known a method for the treatment of fertilizer plant flue gases, wherein the ammonia is scrubbed from the flue gases by means of strong phosphoric acid, whereafter the gases are further treated by means of a solid absorbent. The used strong phosphoric acid solution can be directed to the fertilizer production process in order to return to the process the nutrients present in the solution. On the other hand, the used absorbent cannot be returned to the process, and although savings are achieved in this process in the scrubbing-water evaporation costs, the use of the absorbent increases the production costs, in addition to which the nutrients bound from the gases into the absorbent cannot be returned to the process. The object of the present invention is thus to provide a method for recovering nutrients more completely than previously from the flue gases of a fertilizer plant, such as NPK-fertilizer plant, and substantially without any additional cost.

The main characteristics of the invention are given in the accompanying claims.

By the procedure according to the invention it is possible to exploit the different temperature levels of the gases leaving the fertilizer process, and their evaporation capacity, by scrubbing the hot gases obtained from the drying of the fertilizer by means of the scrubbing solution from the countercurrent scrubbing of the almost watersaturated hot reaction gases, in order to concentrate this solution and advantageously to crystallize nutrients out from this scrubbing solution, so that the nutrients can be returned to the fertilizer production process in the form of a concentrated crystal slurry, which does not dilute the fertilizer slurry obtained from this process and so does not increase the costs of drying it.

In accordance with the present invention it is possible, furthermore, to recover the nutrients more completely than previously from the hot, almost water-saturated reaction gases obtained from the fertilizer production process, by scrubbing and condensing these gases below the dew point, whereupon the aerosol particles present in the gases serve as condensation seeds for the condensing mist particles, these seeds growing, owing to liquid-gas contact, into larger drops which are easily separated from gases in the scrubbing. The condensation seeds form a large material transfer surface into which also gaseous impurities are effectively absorbed. The hot, almost water-saturated reaction gases obtained from the fertilizer production process are cooled by means of the gases cooled in the scrubbing of the hot gases obtained from the drying of the fertilizer, either directly by mixing these gases with each other, or indirectly by scrubbing these gases with the same cycled solution.

Figure 2:
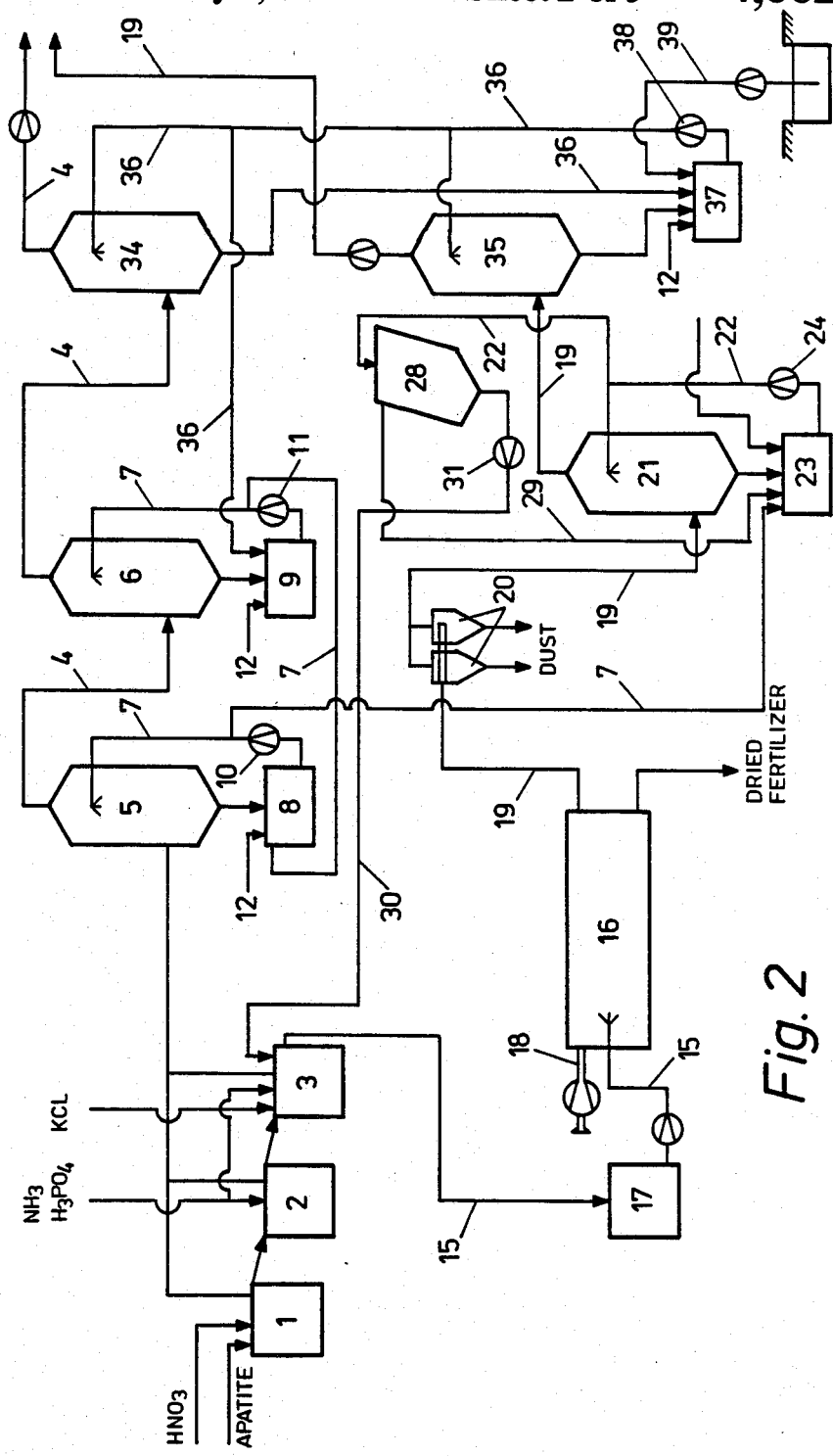
Figure 3:
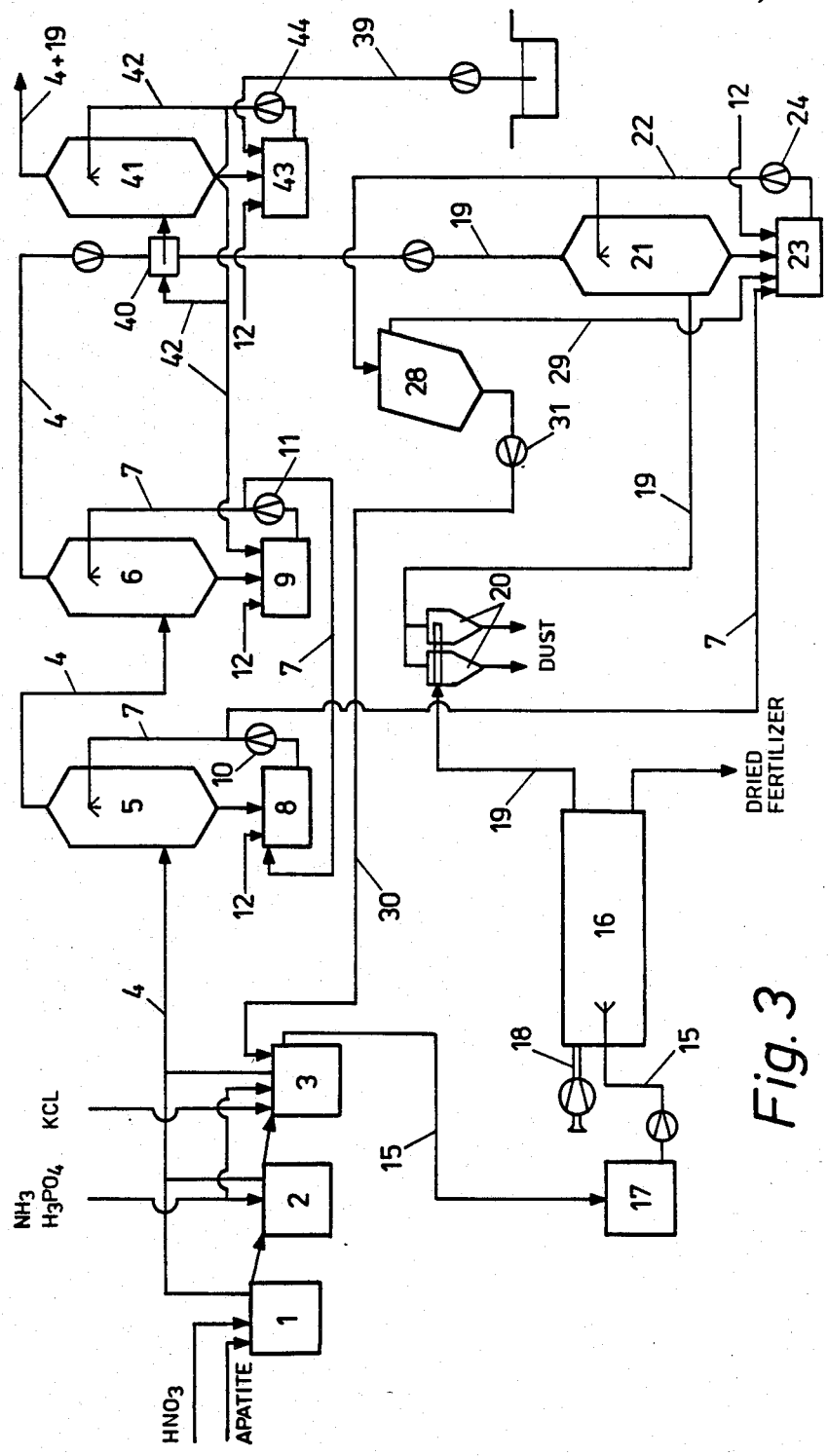

The invention is described below in greater detail with reference to the accompanying drawings, in which FIGS. 1–3 depict diagrammatically different systems for the scrubbing of fertilizer-plant flue gases and for the cycling of the scrubbing solutions.

The use of the same reference numerals in the figures denotes the use of similar elements.

The fertilizer slurry is prepared in the leaching and neutralization reactors 1–3. Under the effect of the heat of neutralization, a large amount of water vapor leaves the reactors 1–3, and along with it ammonia, fluorides, oxides of nitrogen, as well as dashes of slurry and solid particles (aerosols). The flue gases 4 are almost saturated with water vapor, and their temperature is usually 70°–120° C. The gases 4 are scrubbed in scrubbers 5 and 6 by means of a scrubbing solution 7, which is directed from the scrubbing solution containers 8 and 9 by means of cycled-solution pumps 10 and 11. In order to achieve binding of the ammonia in the scrubbing-solution containers 8 and 9, a pH control chemical 12 is added, which may be, for example, sulfuric acid, phosphoric acid, or nitric acid.

The reactor gases 4 are almost saturated with water vapor, no notable temperature decrease occurs in the scrubbers 5 and 6, and the temperature of the scrubbing solution 7 circulating in the scrubbers remains at a level of 60°–95° C. Owing to the high temperature, nutrient salts thus remain in soluble form during these scrubbing stages 5 and 6.

The fertilizer slurry 15 is directed from the neutralization reactor 3 to the leveling container 17 and from there on to the drying drum 16 together with hot air 18. The gases 19 leaving the drying drum 16 contain as an impurity, fertilizer dust, which is separated in dust separation devices 20, as well as gaseous impurities vaporizing from the fertilizer particles during the drying, such as ammonia, oxides of nitrogen, and fluorides. The gaseous impurities are scrubbed off in a wet scrubber 21 by circulating in it the scrubbing liquid 22 from the container 23 by means of a pump 24.

The temperature of the gases leaving the drying drum is at a level of 70°–90° C., and their relative humidity is preferably in the order of 5–10%. For this reason extensive evaporation of water occurs in the scrubber 21, while the gas 19 and the scrubbing solution 22 cool down to a temperature of 40°–55° C., corresponding to the wet temperature of the gas. Owing to the low temperature and the evaporation of water, the solubility of the nutrient salts at this scrubbing stage 21 is lower than that of the reaction gases 4 in the scrubbers 5 and 6.

In the present invention the different temperature levels of the reaction gases 4 and the drying gases 19, and the evaporation capacity of the drying gases 19, are exploited as follows. The scrubbing solution 7 is circulated from the second scrubbing stage 6 to the first stage 5 in accordance with the countercurrent principle. The addition water 25, which can be, for example, the nutrient-bearing scrubbing water or leakage water derived from the process and accumulating in, for example, the floor drain, is first directed into the cycled-solution container 9 of the second scrubbing stage 6 of the reaction gases 4. From there the used scrubbing solution is directed into the cycled-solution container 8 of the first scrubbing stage 5 of the reaction gases 4. Of course, there can be more or fewer successive scrubbing stages than presented here. However, achieving a sufficient scrubbing result requires in total at least two successive scrubbing stages.

Ammonia reacts in the scrubbers 5 and 6 with the acid 12 used for pH control, forming corresponding salts. The ammonium salt content in the scrubbing solution 7 rises in the travel direction of the scrubbing solution from the second scrubbing stage 6 to the first one 5, but owing to the high temperature the saturation point is in general not yet reached in the reaction-gas 4 scrubbers 5 and 6.

From the first scrubbing stage 5 of the reaction gases 4 the scrubbing solution 7 is directed to the cycled-solution container 28 of the scrubber 21 of the drying gases 19. Acid 12 is added also to this scrubbing stage in order to bind the ammonia. In the scrubber 21 the scrubbing solution concentrates and cools as a consequence of the evaporation of water, whereupon the solubility boundary is crossed, and ammonium salts crystallize out from the solution.

The crystallized ammonium salts are removed from the solution by directing from the scrubbing solution cycle 22 a side flow 27 into the crystallized-salt separation device 28, which may be a thickener, a filter, a centrifuge or some other similar separating device, from which the crystal-free solution 29 is returned to the scrubber 21 and the crystals or the crystal slurry 30 are/is returned to the fertilizer process 1–3. The crystallization of the nutrient salts can be enhanced by means of an additional crystallizer 32, which operates using the cooling water 33.

The scrubber 21 of the drying gases 19, together with its scrubbing-solution container 23, thus serves at the same time as an evaporation crystallizer, in which the evaporation energy is obtained from the residual heat of the drying gases 19. The ammonia recovered in the scrubbers 5, 6, 21 is returned to the reactors 1–3 in the form of crystals or a crystal slurry 30 which contains a minimal amount of water.

The evaporation of the water in the scrubber 21 of the drying gases 19 in the manner presented above also enables relatively dilute acids to be used as pH control chemicals 12 and nutrient-bearing waters to be "spent" in the scrubbers, whereupon nutrient-bearing effluents need not be directed from the plant into the watercourses in the surroundings.

FIG. 1 represents the basic solution to the recovery of nutrients according to the invention. In FIG. 1, the reaction gases are scrubbed in a separate scrubbing line in two successive scrubbing steps, and the drying gases are scrubbed in a separate scrubbing line in one scrubbing step. In this context, "scrubbing step" is intended to mean a gas-liquid contact device, and a connected recycling container for the scrubbing liquid including liquid piping and pumps, as well as an acid addition apparatus.

FIG. 2 represents a method of recovering nutrients corresponding to the system in FIG. 1 implemented in a manner which achieves a higher degree of purity of the gases.

In the embodiment according to FIG. 2, the last reactor-gas scrubbing stage is a wet scrubber 34. The last scrubbing stage for the drying gases 19 is a wet scrubber 35. The scrubbing solution 36 is directed into each scrubber 34, 35 from the scrubbing-solution container 37 by means of the pump 38. Acid 12 can be added into the scrubbing-solution container 37 in order to enhance the scrubbing off of the ammonia.

The ultimate scrubbing step of the reaction gases and the ultimate scrubbing step of the drying gases utilize container 37 and associated pumping means 38 as a common recycling liquid reservoir.

The temperature difference between the reaction gases 4 and the drying gases 19 tends to level out in the scrubbers 34 and 35 under the effect of the common scrubbing-solution cycle 36 in such a way that heat is transferred from the hot reaction gases 4 into the scrubbing solution 36 and, respectively, heat is transferred from the scrubbing solution 36 to the dring gases 19. Thus, extensive condensation occurs in the scrubber 34, and, respectively, evaporation occurs in the scrubber 35. Provided that the scrubbers 34 and 35 have sufficient liquid cycling and a sufficient material transfer surface, the gases 4, 19 leaving the scrubbers 34, 35 reach almost the same temperature.

As a consequence of the condensing, favorable conditions are formed in the scrubber 34 for an effective scrubbing off of aerosols and gaseous impurities. The evaporation taking place in the scrubber 35, for its part, creates conditions in which the net water amount condensing from the system does not prevent the feeding of other impure process waters 39 as addition water into the scrubbers. Thus a completely closed water cycle can be achieved in a fertilizer plant also by using this arrangement.

FIG. 3 represents a manner for recovering nutrients corresponding to the system in FIG. 1.

In the embodiment according to FIG. 3, the reaction gases 4 leaving the scrubber 6 and the drying gases 19 leaving the scrubber 21 are directed via a mixing zone 40 into a scrubber 41. Scrubbing solution 42 from the container 43 is directed into both the mixing zone 40 and the scrubber 41 by means of the pump 44. Acid 12 can also be added into the scrubbing-solution container 43 in order to enhance the scrubbing off of the ammonia. The used scrubbing solution 43 is directed from the container 42 into the container 9 in accordance with the countercurrent principle. When the hot, 60°–95° C. reaction gas 4, saturated with water vapor, and the saturated, warm, 40°-55° C. drying gas 19 mix in the mixing zone 40, the gas mixture reaches a state of supersaturation, whereupon the dust and aerosol particles present in the gas serve as condensation seeds. Thus a very large number of small micro-drops are formed. Under the effect of the turbulence prevailing in the mixing zone and of the scrubbing solution 42 sprayed into it, the micro-drops grow larger. The growth of the micro-drops continues in the scrubber 41, where they become scrubbed under the effect of the water sprayed into the scrubber. The formation of the condensation seeds and their growth create conditions for the removal of the aerosols by means of conventional wet scrubbers having a small pressure loss, in a manner economical in terms of energy consumption. At the same time a large contact surface is obtained between the liquid phase and the gas phase, whereupon also the gaseous impurities are absorbed effectively.

The above identified advantageous effects in terms of improved purification result, at least in part, that in FIG. 3, the reaction gases 4 and the drying gases 19 are directed to the mixing zone to the common scrubbing step 41, which is, with regard to the direction of motion of the gases, the last scrubbing step for each of the gas fractions.

The invention is described below further with the aid of an example.

EXAMPLE

In one fertilizer process, from the slurry neutralization process there emerged a gas mixture having the composition:
Volume flow: 45,000 m³/h (under operating conditions)
Temperature: 80° C.
Relative humidity: 85%
The gas mixture contained:
Ammonia: 300 kg/h
Aerosols (such as $NH_4NO_3$): 100 kg
From the drying stage there emerged a gas flow having the composition:
Volume flow: 120,000 m³/h (under operating conditions)
Temperature: 82° C.
Relative humidity: 7%
The gas mixture contained ammonia 100 kg/h
The gases were purified by means of the purification system according to FIG. 3, by using phosphoric acid as the pH control chemical. The scrubbing solution leaving the scrubbing of the reaction gases was directed into the scrubber of drying gases, where the solution concentrated and cooled, whereupon $NH_4H_2PO_4$ salts crystallized out from the solution. The crystals were separated and were returned to the fertilizer process. The mother liquor was returned to the scrubber.

Ultimately the gases were combined, whereupon the gas mixture reached the mist range. There occurred condensation of water and an effective removal of the aerosols. The gas mixture directed into the flue contained ammonia less than 10 kg/h and aerosols less than 5 kg/h.

I claim:

1. In a process for the production of a fertilizer wherein starting materials, employed in said production of fertilizer and containing phosphorous, nitrogen, potassium or combinations thereof are leached and neutralized to produce a fertilizer slurry and flue reaction gases, said reaction gases being water-rich and having a temperature of about 70° to about 120° C. and said slurry being directed to a drying means wherein air is contacted therewith to yield fertilizer product and drying gases, said drying gases having a temperature of about 70°-90° C., the improvement comprising a method fo recovering nutrients comprising one or more of ammonia, fluorides, nitrogen oxides, solid fertilizer particles and aerosols from said flue reaction gases and drying gases, said method including the steps of:
    (a) scrubbing the reaction gases in a countercurrent fashion in scrubbing means with a scrubbing solution;
    (b) recovering said scrubbing solution from said scrubbing means; and
    (c) scrubbing said drying gases by contact with said scrubbing solution recovered in step (b) whereby said scrubbing solution is concentrated with respect to said nutrents.

2. The improvement of claim 1 wherein said concentrated scrubbing solution is directed through a crystal separating device to produce a substantially crystal-free solution and crystals comprising said nutrients, and wherein said crystal-free solution is directed to said scrubbing means and said crystals are directed to said fertilizer production process.

3. The improvement of claim 2 wherein said crystals are in the form of a slurry.

4. The improvement of claim 1 wherein the gases obtained from the countercurrent scrubbing of the reaction gases and the gases obtained from the scrubbing of the drying gases are further scrubbed separately in two parallel scrubbing stages using a common scrubbing liquid in order to condense water contained in said hot water-rich gases obtained from the countercurrent scrubbing of the reaction gases and a portion of the common scrubbing liquid is directed into the countercurrent scrubbing of the reaction gases.

5. The improvement of claim 1 wherein the gases obtained from the countercurrent scrubbing of the reaction gases and the gases obtained from the scrubbing of the drying gases are
    (a) combined in order to condense water contained in said hot water-rich gases obtained from the countercurrent scrubbing of the reaction gases, and
    (b) said combined gases are, scrubbed in a common scrubber wherein a cycled liquid is formed,
    (c) and a portion of said cycled liquid thus obtained in (b) is directed into said scrubbing means 6. The improvement of claim 1 wherein the hot gases obtained from the drying of the fertilizer are exposed to dust separation means before scrubbing thereof.

7. The improvement of claim 5 wherein an acid selected from the group consisting of sulfuric acid, phosphoric acid and nitric acid is added to said cycled liquid 8. The improvement of claim 2 wherein the concentrated scrubbing solution is cooled before separation of crystals therefrom, in order to crystallize nutrients from the solution.

9. The improvement of claim 1 wherein the drying gases have a relative humidity of 5-10% before scrubbing.

* * * * *